United States Patent
Perel et al.

(10) Patent No.: US 6,929,366 B2
(45) Date of Patent: Aug. 16, 2005

(54) MULTIFOCAL CONTACT LENS

(75) Inventors: Ivan Maurice Perel, Misgav (IL); Alain Schmulewitsch, Paris (FR)

(73) Assignee: S.I.B. Invesrements LLC, Atlanta, GA (US)

(*) Notice: Subject to any disclaimer, the term of this patent is extended or adjusted under 35 U.S.C. 154(b) by 0 days.

(21) Appl. No.: 10/640,114

(22) Filed: Aug. 12, 2003

(65) Prior Publication Data

US 2005/0036105 A1 Feb. 17, 2005

(51) Int. Cl.$^7$ ................................................. G02C 7/04
(52) U.S. Cl. ..................................... 351/161; 351/177
(58) Field of Search ............................. 351/161, 160 R, 351/160 H, 162, 177

(56) References Cited

U.S. PATENT DOCUMENTS

| | | | | |
|---|---|---|---|---|
| 5,002,382 A | * | 3/1991 | Seidner ....................... 351/161 |
| 5,125,729 A | | 6/1992 | Mercure ...................... 351/161 |
| 5,436,678 A | | 7/1995 | Carroll ........................ 351/161 |
| 5,493,350 A | | 2/1996 | Seidner ....................... 351/161 |
| 5,526,071 A | | 6/1996 | Seidner et al. ............... 351/161 |
| 5,619,289 A | | 4/1997 | Seidner et al. ............... 351/161 |
| 5,691,797 A | | 11/1997 | Seidner et al. ............... 351/161 |
| 5,754,270 A | | 5/1998 | Rehse et al. ................. 351/161 |
| 5,835,187 A | | 11/1998 | Martin ......................... 351/161 |
| 5,864,379 A | | 1/1999 | Dunn ........................... 351/161 |
| 5,898,473 A | * | 4/1999 | Seidner et al. ............... 351/161 |
| 6,030,077 A | | 2/2000 | Sawano et al. .............. 351/161 |
| 6,116,735 A | | 9/2000 | Wada ........................... 351/161 |
| 6,244,709 B1 | | 6/2001 | Vayntraub et al. ........... 351/161 |
| 6,260,966 B1 | | 7/2001 | Sawano et al. .............. 351/161 |
| 6,357,876 B1 | * | 3/2002 | Oyama et al. ............... 351/161 |
| 6,457,826 B1 | | 10/2002 | Lett ............................. 351/161 |
| 6,540,353 B1 | | 4/2003 | Dunn ........................... 351/161 |
| 2002/0036748 A1 | | 3/2002 | Chapoy et al. |
| 2002/0093623 A1 | | 7/2002 | Duppstadt |
| 2002/0186345 A1 | | 12/2002 | Duppstadt |
| 2003/0043342 A1 | | 3/2003 | Seidner |
| 2003/0076478 A1 | | 4/2003 | Cox |

* cited by examiner

Primary Examiner—Jordan M. Schwartz
(74) Attorney, Agent, or Firm—Abelman, Frayne & Schwab

(57) ABSTRACT

A contact lens has front and rear surfaces, the rear surface having a base curve fits the eye of a wearer. The front surface has a central circular zone which is substantially spherical and which, together with the base curve, generates a central zone power selected so as to correct near vision of the wearer. The front surface also has an annular outer zone which is substantially spherical and which, together with the base curve, generates an outer zone power which is less than the central zone power. The front surface further includes an annular region, intermediate the central and outer zones, having one or more contiguous intermediate annular zones, each of which is substantially spherical. The one or more intermediate annular zones generate respective one or more intermediate zone refractive powers in a monotonic progression of decreasing refractive power from the central zone to the annular outer zone.

26 Claims, 1 Drawing Sheet

MULTIFOCAL CONTACT LENS

FIELD OF THE INVENTION

The present invention relates generally to contact lenses, and specifically to multifocal contact lenses.

BACKGROUND OF THE INVENTION

Accommodation enables a person of normal vision to focus on objects from infinity to a near point, typically of the order of 25 cm or less from the eye. A presbyope has lost the ability to accommodate over such a large range, and typically requires two corrections: a distance correction for focussing to infinity, and a near correction for focussing to close objects. Corrections, which are typically different for each eye, are usually prescribed to a quarter of a diopter, and may range between approximately +8—-8 diopters for both the distance correction and the near correction.

Multifocal spectacles provide the two corrections for each eye, as well as intermediate corrections, in separate regions of one lens. Such spectacles rely on the fact that the spectacle lenses are relatively fixed with respect to the eye, so that the spectacle wearer usually looks through the higher portions of the lens for distant objects, and the lower portion of the lens for near objects.

Multifocal contact lenses that provide both corrections for a particular eye in a single lens are known in the art. However, unlike spectacle lenses, contact lenses move with the motion of the eye. Thus, multifocal contact lenses known in the art use a number of different systems to enable a presbyope to be adequately corrected for viewing both near and distant objects. Unfortunately, not all of these systems have been well received by users.

U.S. Pat. No. 5,125,729, to Mercure, whose disclosure is incorporated herein by reference, describes a lens which has, on its front surface, a central spherical circular area which is surrounded by an annular aspherical area. The central area is responsible for distance vision. The annular aspherical area enables vision at all distances including reading.

U.S. Pat. No. 5,526,071, to Seidner et al., whose disclosure is incorporated herein by reference, describes a diagnostic contact lens. After diagnosis involving an over-refraction process, the patient is fitted with a prescription lens. The prescription lens has two front annular aspheric surfaces, or in the case where intermediate vision is to be accommodated, three (or more) front aspheric surfaces. The distance vision area is a central area of the lens, while the near vision area is one of the annular areas in the periphery of the front surface of the lens.

U.S. Pat. Nos. 5,619,289 and 5,691,797 to Seidner et al., whose disclosures are incorporated herein by reference, describe a lens having a front central aspheric surface for distance vision correction with a diameter of about 1.5–2.5 mm and an eccentricity of about –0.8. A first annular surface surrounding the central surface is aspheric and has a diameter of about 2.0–3.5 mm. Other annular surfaces have diameters of about 2.3–4.0, and 3.5–8.0, and may be spheric or aspheric.

U.S. Pat. No. 5,754,270 to Rehse et al., whose disclosure is incorporated herein by reference, describes a lens having a central aspheric optic zone with a diopter power equal to the distant power correction, plus an add power range of from 2.5 to 2.25 diopters from center outward. There is a second "blending zone" concentric with the center zone, that provides a rapid power shift of about –0.5 to about –1.25 diopters over a small distance of about 0–0.2 mm, typically about 0.05 mm.

U.S. Pat. Nos. 5,864,379 and 6,540,353 to Dunn, whose disclosures are incorporated herein by reference, describe a lens having a central spherical circular region that is overcorrected for near vision, typically by about 25%–100%, with a diameter of about 1.0–2.5 mm. The central zone is surrounded by up to three annular aspherical zones, the first two having thicknesses of about 0.5 mm, the third having an outer diameter of about 8 mm.

U.S. Pat. Nos. 6,030,077 and 6,260,966 to Sawano et al., whose disclosures are incorporated herein by reference, describe a lens having a central circular spheric region with a first constant power, an intermediate annular aspheric region, and an outer annular spheric region having a second constant power. The radii of different parts of the intermediate region are calculated from two opposing parabolic curves which smoothly connect to each other and to the constant powers of the center and outer zones.

U.S. Pat. No. 6,116,735 to Wada, whose disclosure is incorporated herein by reference, describes a lens having zones which alternate between near- and far-correction zones. Typically there are four zones. A central near-vision zone is approximately 1–2 mm diameter, and the other zones have equal widths of about 0.63 mm.

Correct provision of a multifocal contact lens for a specific eye typically requires knowledge of both the near and far correction of the eye of the patient. Since both corrections are typically prescribed to within a quarter of a diopter, it will be appreciated that there are a large number of near- and far-combinations. Notwithstanding that certain multifocal lenses known in the art, including some of those described above, claim to be suitable for ranges of prescriptions, there is a need for an improved multifocal contact lens.

SUMMARY OF THE INVENTION

It is an object of some aspects of the present invention to provide a contact lens which may be used by persons having a range of prescriptions.

In a preferred embodiment of the present invention, a multifocal contact lens, herein also termed a multirange contact lens, is formed of a transparent material and comprises a rear surface having a base curve which is adapted to fit to the eye of a wearer, and a front surface comprising a plurality of concentric spherical zones. A central circular zone is formed so that the refractive power of the central zone corrects the wearer's near vision. An annular outer zone is configured to have an outer zone power that is a preset value less than the central zone refractive power. A plurality, preferably two, of intermediate annular zones are formed between the central zone and the outer zone. Most preferably, the intermediate annular zones have approximately equal widths. The power of each intermediate zone is configured to lie between the central and annular outer zone powers, each intermediate zone power being set so that the powers of all the zones form a monotonic progression, preferably a linear monotonic progression. The inventors have found that the multirange contact lens gives good distance correction for wearers having distance prescriptions within a range from about 50% to about 230% of the preset value.

In some preferred embodiments of the present invention, the central zone has a diameter of approximately 2.5 mm, the intermediate annular zones have approximately equal widths having a value approximately equal to 0.5 mm, and the annular outer zone has an internal diameter of approximately 4.5 mm and an external diameter of approximately 9 mm. The preset value, i.e., the power by which the annular outer zone is less than the central zone power, is most preferably a value between approximately 1 and approximately 2 diopters.

There is therefore provided, according to a preferred embodiment of the present invention, a contact lens, including a transparent material having front and rear surfaces;

wherein the rear surface has a base curve which is adapted to fit an eye of a wearer of the lens; and wherein the front surface includes:

a central circular zone which is substantially spherical and which, together with the base curve, is configured to generate a central zone refractive power selected so as to correct near vision of the wearer;

an annular outer zone which is substantially spherical and which, together with the base curve, is configured to generate an outer zone refractive power which is less than the central zone power; and an annular region, intermediate the central zone and the outer zone, consisting of one or more contiguous intermediate annular zones, each of which is substantially spherical, the one or more intermediate annular zones being configured, together with the base curve, to generate respective one or more intermediate zone refractive powers defining a monotonic progression of decreasing refractive power from the central zone to the annular outer zone.

Preferably, the edges between the zones have substantially sharp radius transitions, and an acuity of the transitions is substantially that produced by applying a molding process to the lens.

Preferably, the monotonic progression includes a smooth progression defined by an algebraic function giving values of the one or more intermediate zone refractive powers in terms of the central zone refractive power and the outer zone refractive power, and the monotonic progression consists of a substantially linear progression.

Alternatively, the monotonic progression is a progression chosen from a geometric progression and a logarithmic progression.

Preferably, the central circular zone has a diameter of approximately 2.5 mm.

Preferably, the one or more intermediate annular zones consist of two or more intermediate annular zones, the two or more intermediate zones having approximately equal widths, preferably equal to a value of approximately 0.5 mm.

Preferably, the outer zone refractive power is between approximately 1 diopter and approximately 2 diopters less than the central zone refractive power, and is preferably approximately 1.25 diopters less than the central zone refractive power.

Preferably, the annular outer zone has an inner diameter of approximately 4.5 mm and an outer diameter of approximately 9 mm.

Preferably, the base curve includes a spherical curve having a single radius of curvature.

Alternatively, the base curve includes a toric curve having two different radii of curvature.

There is further provided, according to a preferred embodiment of the present invention, a method for forming a contact lens, consisting of:

forming on a transparent material a rear surface comprising a base curve which is adapted to fit an eye of a wearer of the lens; and forming on the transparent material a front surface including:

a central circular zone which is substantially spherical and which, together with the base curve, generates a central zone refractive power selected so as to correct near vision of the wearer, an annular outer zone which is substantially spherical and which, together with the base curve, generates an outer zone refractive power which is less than the central zone power, and an annular region, intermediate the central zone and the outer zone, consisting of one or more contiguous intermediate annular zones, each of which is substantially spherical, the one or more intermediate annular zones, together with the base curve, generating respective one or more intermediate zone refractive powers defining a monotonic progression of decreasing refractive power from the central zone to the annular outer zone.

Preferably, forming the front surface includes forming edges between the zones having substantially sharp radius transitions, wherein an acuity of the transitions is substantially that produced by applying a molding process to the lens.

The present invention will be more fully understood from the following detailed description of the preferred embodiments thereof, taken together with the drawing, a brief description of which follows.

DETAILED DESCRIPTION OF PREFERRED EMBODIMENTS

Figure 1:
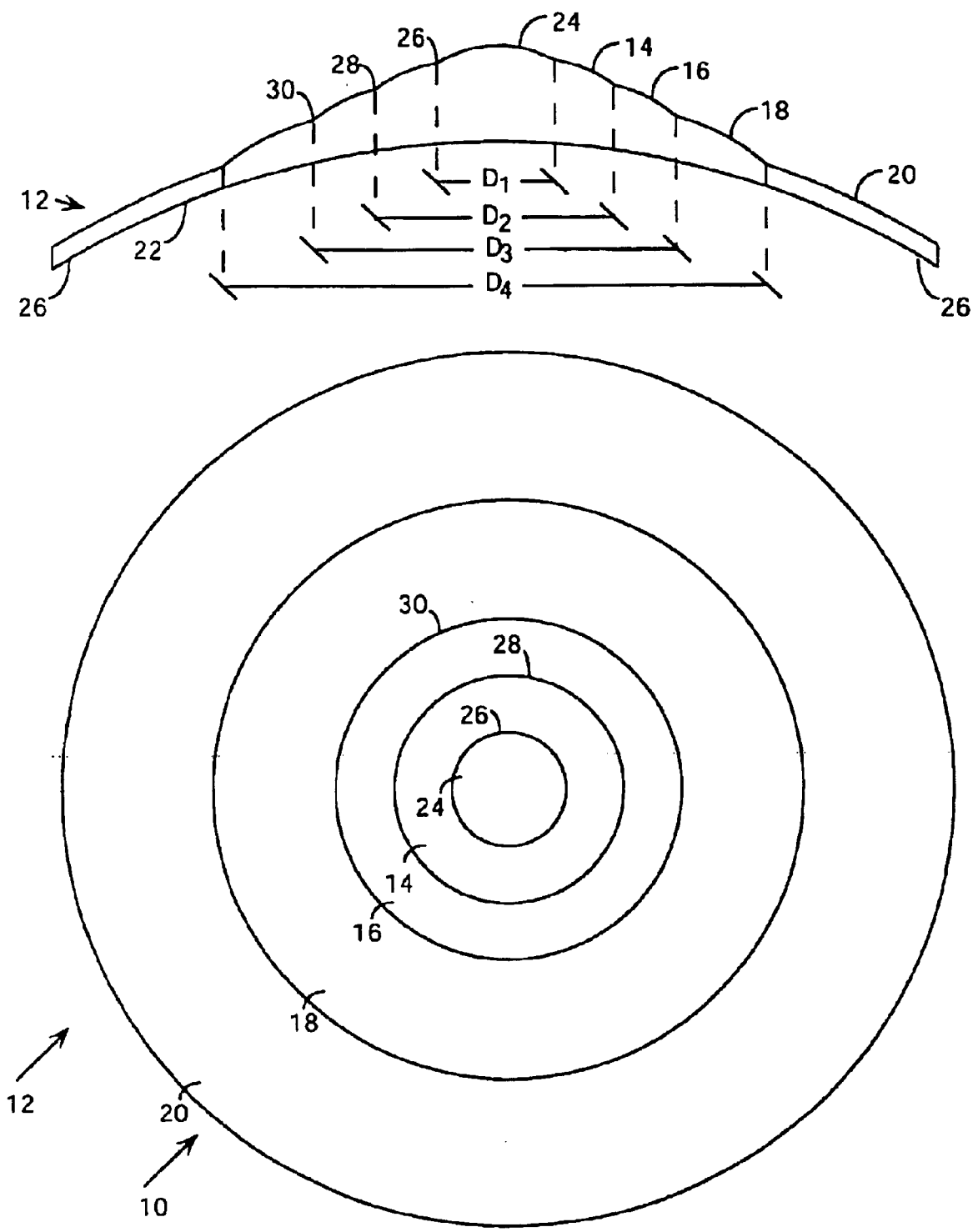
FIG. 1 illustrates schematic top and cross-section views of a multifocal contact lens, according to a preferred embodiment of the present invention.

Reference is now made to FIG. 1, which illustrates schematic top and cross-section views of a multifocal contact lens 10, herein also termed multirange lens 10, according to a preferred embodiment of the present invention. Lens 10 is most preferably formed from a hydratable transparent material, such as Methafilcon A, that is known in the art as being used to produce contact lenses, and that is typically used for producing "soft" contact lenses. Alternatively, lens 10 may be produced from any other transparent material, such as glass or plastic, that is adapted to produce contact lenses, such as material known in the art for producing "hard" contact lenses.

After production, dimensions of lens 10 may alter, typically when the material of the lens hydrates, to "wet" dimensions, which are the dimensions of the lens under normal use. Unless otherwise stated, dimensions of lens 10 given hereinbelow are wet dimensions.

Lens 10 comprises a near surface 22, which is formed as a base curve to fit the eye of the user of the lens. Except where otherwise stated, the base curve is herein assumed to be a curve having a single base curve radius of approximately 8.8 mm. Typically, an annular relief 26, having a width of approximately 0.5 mm, is provided in the base curve for the purposes of easy fitting to the eye.

A far surface 12 of lens 10 comprises a plurality, preferably four, of spherical zones which provide optical correction for the eye of the wearer. Far surface 12 also comprises another zone 20, which acts as a substantially optically inactive carrier for the optical zones, and which typically has an outer diameter of approximately 14.2 mm, corresponding to the overall diameter of lens 10. A central circular zone 24, having an outer edge 26, preferably has a diameter $D_1$ of approximately 2.5 mm. A central zone spherical radius $R_1$ has a value so that a central zone refractive power $P_1$, which is a function of the central zone radius and the base curve spherical radius, is substantially constant and is approximately equal to the near correction of the lens wearer.

An outer annular zone 18 of surface 12 has an internal diameter $D_3$ of approximately 4.5 mm, and an external diameter $D_4$ of approximately 9 mm. The outer annular zone is formed to have an outer zone spherical radius $R_4$ that, when taken with the base curve, gives an outer zone refractive power $P_4$ that is a preset value less than central zone power $P_1$. Most preferably, the preset value is a value that is between approximately 1 and approximately 2 diopters.

Between central zone 24 and outer annular zone 18 are two intermediate annular zones, each preferably having a width of approximately 0.5 mm. A first intermediate zone 14 with an outer edge 28 is contiguous with central zone 12, and has an external diameter $D_2$ that is approximately 3.5 mm. Intermediate zone 14 is formed to have a first intermediate zone spherical radius $R_2$, which, when taken with the base curve radius, produces a first intermediate zone power of $P_2$. A second intermediate zone 16 with an outer edge 30 is contiguous with first intermediate zone 14 and with zone 18. Intermediate zone 16 is formed to have a second intermediate zone spherical radius $R_3$, which, when taken with the base curve radius, produces a second intermediate zone power of $P_3$.

Powers $P_2$ and $P_3$ are preferably chosen so that $P_1$, $P_2$, $P_3$, and $P_4$ form a monotonic progression, preferably a relatively smooth monotonic progression such as a progression that may be defined by an algebraic function giving values of $P_2$, $P_3$ in terms of $P_1$ and $P_4$. In some preferred embodiments of the present invention, powers $P_2$ and $P_3$ are averages of powers $P_1$ and $P_4$, the averages most preferably being weighted so that $P_1$, $P_2$, $P_3$, and $P_4$ form a substantially linear progression. Thus, powers $P_2$ and $P_3$ are most preferably derived according to the following equations:

$$P_2 = \frac{(2P_1 + P_4)}{3} \quad (1)$$

$$P_3 = \frac{(P_1 + 2P_4)}{3} \quad (2)$$

For example, if the preset value by which $P_4$ is less than $P_1$ is approximately 1.25 diopters, approximate values for $P_2$, $P_3$, and $P_4$ in terms of $P_1$ are given by:

$$P_2 = P_1 - 0.42 \quad (3)$$

$$P_3 = P_1 - 0.83 \quad (4)$$

In this case, for a lens 10 which is to be produced for a presbyope with a near correction of +6.25 diopters, the values of $P_1$, $P_2$, $P_3$, and $P_4$ are respectively approximately +6.25 Ds, +5.83 Ds, +5.42 Ds, and +5.00 Ds.

The expressions of equations (1)–(4) apply for powers $P_2$ and $P_3$ when the progression $P_1$, $P_2$, $P_3$, and $P_4$ is a substantially linear progression. Those skilled in the art will be able to derive equations for $P_2$ and $P_3$, in terms of $P_1$ and $P_4$, for other types of monotonic progression of $P_1$, $P_2$, $P_3$, and $P_4$, such as a logarithmic or a geometric progression.

The powers of each zone are produced by configuring each zone with the zone's respective radius of curvature $R_1$, $R_2$, $R_3$, and $R_4$. Tables I and II below give approximate values of $R_1$, $R_2$, $R_3$, and $R_4$ for different near corrections (N) corresponding to $P_1$, which the inventors have found in practice give powers corresponding to equations (1) and (2). Values in the table are for a base curve of surface 22 having a radius of 8.8 mm. Tables I and II also give a center thickness (C.T.) for each lens. The center thickness is calculated assuming that the edge of the lens has a thickness of 0.14 mm.

TABLE I

| N ($P_1$) | Central zone ($R_1$) | First Intermediate zone ($R_2$) | Second Intermediate zone ($R_3$) | Outer zone ($R_4$) | C.T. |
|---|---|---|---|---|---|
| 0 | 8.828 | 8.889 | 8.951 | 9.012 | 0.18 |
| +0.25 | 8.776 | 8.838 | 8.901 | 8.964 | 0.18 |
| +0.5 | 8.723 | 8.788 | 8.852 | 8.916 | 0.18 |
| +0.75 | 8.672 | 8.737 | 8.802 | 8.867 | 0.18 |
| +1 | 8.619 | 8.686 | 8.753 | 8.82 | 0.18 |
| +1.25 | 8.570 | 8.638 | 8.707 | 8.773 | 0.18 |
| +1.5 | 8.519 | 8.588 | 8.656 | 8.726 | 0.193 |
| +1.75 | 8.468 | 8.539 | 8.609 | 8.68 | 0.202 |
| +2 | 8.418 | 8.489 | 8.561 | 8.633 | 0.211 |
| +2.25 | 8.368 | 8.44 | 8.514 | 8.587 | 0.22 |
| +2.5 | 8.318 | 8.391 | 8.466 | 8.541 | 0.229 |
| +2.75 | 8.268 | 8.342 | 8.418 | 8.493 | 0.238 |
| +3 | 8.217 | 8.293 | 8.371 | 8.447 | 0.247 |
| +3.25 | 8.167 | 8.246 | 8.323 | 8.4 | 0.256 |
| +3.5 | 8.117 | 8.197 | 8.275 | 8.354 | 0.265 |
| +3.75 | 8.068 | 8.148 | 8.228 | 8.308 | 0.275 |
| +4 | 8.018 | 8.099 | 8.18 | 8.261 | 0.284 |
| +4.25 | 7.969 | 8.051 | 8.134 | 8.216 | 0.295 |
| +4.5 | 7.919 | 8.003 | 8.086 | 8.17 | 0.301 |
| +4.75 | 7.87 | 7.955 | 8.039 | 8.124 | 0.314 |
| +5 | 7.821 | 7.906 | 7.992 | 8.077 | 0.324 |
| +5.25 | 7.772 | 7.858 | 7.946 | 8.032 | 0.335 |
| +5.5 | 7.723 | 7.811 | 7.898 | 7.987 | 0.345 |
| +5.75 | 7.674 | 7.763 | 7.852 | 7.941 | 0.356 |
| +6 | 7.625 | 7.716 | 7.806 | 7.896 | 0.367 |
| +6.25 | 7.58 | 7.67 | 7.76 | 7.85 | 0.377 |
| +6.5 | 7.529 | 7.622 | 7.713 | 7.806 | 0.389 |
| +6.75 | 7.481 | 7.574 | 7.668 | 7.761 | 0.4 |
| +7 | 7.434 | 7.528 | 7.622 | 7.716 | 0.412 |
| +7.25 | 7.386 | 7.481 | 7.577 | 7.672 | 0.423 |
| +7.75 | 7.292 | 7.389 | 7.486 | 7.583 | 0.447 |
| +8.25 | 7.199 | 7.297 | 7.396 | 7.495 | 0.42 |
| +8.75 | 7.107 | 7.207 | 7.308 | 7.408 | 0.497 |
| +9.25 | 7.015 | 7.118 | 7.22 | 7.322 | 0.523 |

TABLE II

| N ($P_1$) | Central zone ($R_1$) | First Intermediate zone ($R_2$) | Second Intermediate zone ($R_3$) | Outer zone ($R_4$) | C.T. |
|---|---|---|---|---|---|
| −0.25 | 8.879 | 8.94 | 9 | 9.06 | 0.18 |
| −0.5 | 8.93 | 8.99 | 9.049 | 9.108 | 0.18 |
| −0.75 | 8.982 | 9.04 | 9.098 | 9.156 | 0.18 |
| −1 | 9.033 | 9.09 | 9.147 | 9.203 | 0.18 |
| −1.25 | 9.085 | 9.14 | 9.196 | 9.251 | 0.18 |
| −1.5 | 9.135 | 9.189 | 9.243 | 9.297 | 0.18 |
| −1.75 | 9.187 | 9.239 | 9.292 | 9.345 | 0.18 |
| −2 | 9.237 | 9.288 | 9.34 | 9.391 | 0.18 |
| −2.25 | 9.287 | 9.337 | 9.387 | 9.438 | 0.18 |
| −2.5 | 9.337 | 9.386 | 9.435 | 9.484 | 0.18 |
| −2.75 | 9.386 | 9.435 | 9.483 | 9.53 | 0.18 |
| −3 | 9.436 | 9.483 | 9.53 | 9.577 | 0.18 |
| −3.25 | 9.485 | 9.53 | 9.577 | 9.622 | 0.18 |
| −3.5 | 9.535 | 9.579 | 9.623 | 9.668 | 0.18 |
| −3.75 | 9.583 | 9.625 | 9.6669 | 9.713 | 0.18 |
| −4 | 9.631 | 9.673 | 9.716 | 9.757 | 0.18 |
| −4.25 | 9.678 | 9.719 | 9.761 | 9.802 | 0.18 |
| −4.5 | 9.726 | 9.766 | 9.806 | 9.846 | 0.18 |
| −4.75 | 9.772 | 9.812 | 9.851 | 9.889 | 0.18 |

TABLE II-continued

| N (P$_1$) | Central zone (R$_1$) | First Intermediate zone (R$_2$) | Second Intermediate zone (R$_3$) | Outer zone (R$_4$) | C.T. |
|---|---|---|---|---|---|
| −5.25 | 9.865 | 9.902 | 9.938 | 9.976 | 0.18 |
| −5.75 | 9.956 | 9.991 | 10.026 | 10.06 | 0.18 |
| −6.25 | 10.044 | 10.077 | 10.111 | 10.143 | 0.18 |
| −6.75 | 10.131 | 10.162 | 10.193 | 10.224 | 0.18 |

Most preferably, after production, lens 10 is checked to confirm that the powers of zones 24, 14, 16, and 18 conform respectively to the prescribed near vision correction, the values given by equations (1) and (2) (if the linear progression described above with reference to the equations is applied), and the near vision correction less the preset value. If necessary, the spherical radius of the specific zones are adjusted so that the powers are in conformity with these values.

The inventors have found that multirange contact lenses produced according to the criteria described hereinabove, for a preset value of 1.25 diopters, give good vision for distances from approximately 25 cm to infinity, for wearers having a range of distance corrections that are approximately 0.6 to approximately 2.8 diopters less than the wearer's near correction. For all preset values, good vision occurs for distance corrections that are less than the wearer's near correction by approximately 50% to approximately 230% of the preset value.

Lens 10 may be produced by any contact lens process known in the art, such as, but not limited to, cutting on a lathe or molding. Most preferably, radius transitions between zones, i.e., at zone edges 26, 28, and 30, are substantially sharp, and the method of production for lens 10 is most preferably chosen so as to give substantially sharp transitions. Consequently, within specific zones 24, 14, 16, and 18, each zone is formed to have a substantially constant power. The inventors have found that a process of molding gives suitably acute radius transitions. Alternatively, lens 10 may be formed by cutting on a lathe, followed by buffing.

The description hereinabove for lens 10 has assumed that there are two intermediate annular zones between central zone 24 and the outer annular zone 18. It will be appreciated that the scope of the present invention includes whole numbers of intermediate annular zones other than two, wherein the powers of such intermediate zones form, when taken together with the central zone power and the outer annular zone power, a monotonic progression.

In some preferred embodiments of the present invention, near surface 22 is implemented as a toric curve, e.g., to correct for astigmatism, the toric curve having two different radii of curvature producing two respective powers. Preferably, two radii of curvature R$_1$, for each power, are calculated, and the values are averaged to find an actual value of R$_1$. A similar averaging procedure is applied to find actual values to use for R$_2$, R$_3$, and R$_4$.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A contact lens, comprising a transparent material having front and rear surfaces,
   wherein the rear surface comprises a base curve which is adapted to fit an eye of a wearer of the lens, and
   wherein the front surface comprises:
   a central circular zone which is spherically curved and which, together with the base curve, is configured to generate a central zone refractive power selected so as to correct near vision of the wearer;
   an annular outer zone which is spherically curved and which, together with the base curve, is configured to generate an outer zone refractive power which is less than the central zone power; and
   an annular region, intermediate the central zone and the outer zone, comprising one or more contiguous intermediate annular zones, each of which is spherically curved, the one or more intermediate annular zones being configured, together with the base curve, to generate respective one or more intermediate zone refractive powers defining a monotonic progression of decreasing refractive power from the central zone to the annular outer zone,
   wherein the outer zone refractive power is between approximately 1 diopter and approximately 2 diopters leass than the central zone refractive power and
   wherein the one or more intermediate annular zones comprise two or more intermediate annular zones having differing powers, and wherein the two or more intermediate zones comprise approximately equal widths.

2. The contact lens according to claim 1, wherein edges between the zones comprise substantially sharp radius transitions.

3. The contact lens according to claim 1, wherein an acuity of the transitions is produced by applying a molding process to the lens.

4. The contact lens according to claim 1, wherein the monotonic progression comprises a smooth progression defined by an algebraic function giving values of the two or more intermediate zone refractive powers in terms of the central zone refractive power and the outer zone refractive power.

5. The contact lens according to claim 1, wherein the monotonic progression comprises a substantially linear progression.

6. The contact lens according to claim 1,
   wherein the central circular zone comprises a diameter of approximately 2.5 mm.

7. The contact lens according to claim 1, wherein the equal widths comprise a value of approximately 0.5 mm.

8. The contact lens according to claim 1, wherein the outer zone refractive power is approximately 1.25 diopters less than the central zone refractive power.

9. The contact lens according to claim 1,
   wherein the annular outer zone comprises an inner diameter of approximately 4.5 mm and an outer diameter of approximately 9 mm.

10. The contact lens according to claim 1, wherein the base curve comprises a spherical curve having a single radius of curvature.

11. The contact lens according to claim 1, wherein the base curve comprises a toric curve having two different radii of curvature.

12. A contact lens, comprising a transparent material having front and rear surfaces, wherein the rear surface comprises a base curve which is adapted to fit an eye of a wearer of the lens, and wherein the front surface comprises:

a central circular zone which is spherically curved and which, together with the base curve, is configured to generate a central zone refractive power selected so as to correct near vision of the wearer;

an annular outer zone which is spherically curved and which, together with the base curve, is configured to generate an outer zone refractive power which is less than the central zone power; and an annular region, intermediate the central zone and the outer zone, comprising one or more contiguous intermediate annular zones, each of which is spherically curved, the one or more intermediate annular zones being configured, together with the base curve, to generate respective one or more intermediate zone refractive powers defining a monotonic progression of decreasing refractive power from the central zone to the annular outer zone, wherein the outer zone refractive power is between approximately 1 diopter and approximately 2 diopters less than the central zone refractive power, and wherein the monotonic progression comprises a progression chosen from a geometric progression and a logarithmic progression.

13. A method for forming a contact lens, comprising:

forming on a transparent material a rear surfaces comprising a base curve which is adapted to fit an eye of a wearer of the lens; and forming on the transparent material a front surface comprising:

a central circular zone which is spherically curved and which, together with the base curve, generates a central zone refractive power selected so as to correct near vision of the wearer;

an annular outer zone which is spherically curved and which, together with the base curve, generates an outer zone refractive power which is less than the central zone power, and an annular region, intermediate the central zone and the outer zone, comprising one or more contiguous intermediate annular zones, each of which is spherically curved, the one or more intermediate annular zones, together with the base curve, generating respective one or more intermediate zone refractive powers defining a monotonic progression of decreasing refractive power from the central zone to the annular outer zone, wherein the outer zone refractive power is between approximately 1 diopter and approximately 2 diopters less than the central zone refractive power, and wherein the one or more intermediate annular zones comprise two or more intermediate annular zones having differing powers, and wherein the two or more intermediate zones comprise approximately equal widths.

14. The method according to claim 13, wherein forming the front surface comprises forming edges between the zones having substantially sharp radius transitions.

15. The method according to claim 14, wherein an acuity of the transitions is produced by applying a molding process to the lens.

16. The method according to claim 13, wherein the monotonic progression comprises a smooth progression defined by an algebraic function giving values of the two or more intermediate zone refractive powers in terms of the central zone refractive power and the outer zone refractive power.

17. The method according to claim 13, wherein the monotonic progression comprises a substantially linear progression.

18. The method according to claim 13 wherein the central circular zone comprises a diameter of approximately 2.5 mm.

19. The method according to claim 13, wherein the equal widths comprise a value of approximately 0.5 mm.

20. The method according to claim 13, wherein the outer zone refractive power is approximately 1.25 diopters less than the central zone refractive power.

21. The method according to claim 13 wherein the annular outer zone comprises an inner diameter of approximately 4.5 mm and an outer diameter of approximately 9 mm.

22. The method according to claim 13, wherein the base curve comprises a spherical curve having a single radius of curvature.

23. The method according to claim 13, wherein the base curve comprises a toric curve having two different radii of curvature.

24. A method for forming a contact lens, comprising:

forming on a transparent material a rear surface comprising a base curve which is adapted to fit an eye of a wearer of the lens; and forming on the transparent material a front surface comprising:

a central circular zone which is spherically curved and which, together with the base curve, generates a central zone refractive power selected so as to correct near vision of the wearer, an annular outer zone which is spherically curved and which, together with the base curve, generates an outer zone refractive power which is less than the central zone power, and an annular region, intermediate the central zone and the outer zone, comprising one or more contiguous intermediate annular zones, each of which is spherically curved, the one or more intermediate annular zones, together with the base curve, generating respective one or more intermediate zone refractive powers defining a monotonic progression of decreasing refractive power from the central zone to the annular outer zone, wherein the outer zone refractive power is between approximately 1 diopter and approximately 2 diopters less than the central zone refractive power, and wherein the monotonic progression comprises a progression chosen from a geometric progression and a logarithmic progression.

25. A contact lens, comprising a transparent material having front and rear surfaces, wherein the rear surface comprises a base curve which is adapted to fit an eye of a wearer of the lens, and wherein the front surface comprises:

a central circular zone which is spherically curved and which, together with the base curve, is configured to generate a central zone refractive power selected so as to correct near vision of the wearer;

an annular outer zone which is spherically curved and which, together with the base curve, is configured to generate an outer zone refractive power which is less than the central zone power; and an annular region, intermediate the central zone and the outer zone, comprising two or more contiguous intermediate annular zones, each of which is spherically curved, the two or more intermediate annular zones being configured, together with the base curve, to generate respective one or more intermediate zone refractive powers having differing powers and defining a monotonic progression of decreasing refractive power from the central zone to the annular outer zone, wherein the outer zone refractive power is between approximately 1 diopter and approximately 2 diopters less than the central zone refractive power.

26. A method for forming a contact lens, comprising:

forming on a transparent material a rear surface comprising a base curve which is adapted to fit an eye of a wearer of the lens; and forming on the transparent material a front surface comprising:

a central circular zone which is spherically curved and which, together with the base curve, generates a central zone refractive power selected so as to correct near vision of the wearer, an annular outer zone which is spherically curved and which, together with the base curve, generates an outer zone refractive power which is less than the central zone power, and an annular region, intermediate the central zone and the outer zone, comprising two or more contiguous intermediate annular zones, each of which is spherically curved, the two or more intermediate annular zones, together with the base curve, generating respective one or more intermediate zone refractive powers having differing powers and defining a monotonic progression of decreasing refractive power from the central zone to the annular outer zone, wherein the outer zone refractive power is between approximately 1 diopter and approximately 2 diopters less than the central zone refractive power.

* * * * *